United States Patent [19]

Edwards

[11] 4,387,207

[45] Jun. 7, 1983

[54] RESORCINOL COMPOSITION AND METHOD OF MAKING SAME

[75] Inventor: Bill R. Edwards, Wichita, Kans.

[73] Assignee: Paratech, Inc., Wichita, Kans.

[21] Appl. No.: 398,213

[22] Filed: Jul. 14, 1982

[51] Int. Cl.$^3$ .............................................. C08G 65/48
[52] U.S. Cl. ..................................... 528/86; 528/167; 528/176; 528/193; 528/194; 528/211; 528/212; 528/218; 528/219; 528/486; 528/487; 528/488; 528/489; 528/490
[58] Field of Search ................. 528/86, 167, 212, 218, 528/219, 176, 193, 194, 211, 486, 487, 488, 489, 490

[56] References Cited

U.S. PATENT DOCUMENTS 3,525,379  8/1970  Johnson et al. ...................... 525/509
4,152,320  5/1979  Shapiro et al. ...................... 528/219

*Primary Examiner*—Lester L. Lee
*Attorney, Agent, or Firm*—Schwartz, Jeffery, Schwaab, Mack, Blumenthal & Koch

[57] ABSTRACT

Modified resorcinol polymers are prepared by mixing acid or base with liquid phenol-resorcinol resin, permitting the mixture to stand for a period of at least about 48 hours followed by separation of an aqueous solution from the resin to recover the resorcinol polymer. The modified resorcinol has improved physical characteristics when employed in molding compositions, coating compositions and the like.

22 Claims, No Drawings

RESORCINOL COMPOSITION AND METHOD OF MAKING SAME

BACKGROUND OF THE INVENTION

1. Field of the Invention

This invention relates generally to unique resorcinol resins and, more particularly, to resorcinol resins which are useful as molding compositions, coatings, binders and the like.

2. Description of the Prior Art

Resorcinol resins and, in particular, phenol-resorcinol aldehyde resins are commonly used as adhesives in the production of waterproof laminates. Several phenol-resorcinol resin compositions are known which may be catalyzed with formaldehyde-type catalysts to produce cold set laminates. One such phenol-resorcinol resin which may be catalyzed and used in this fashion is commercially available under the name CASCOPHEN LT-68D (sold by Borden Chemical, Division of Borden Inc.). The adhesive mix when catalyzed may provide for room temperature curing of laminates, particularly plywood-type laminates.

Foundry cores employing phenol-resorcinol-aldehyde resins are also well known. Phenol-resorcinol resin compositions are particularly useful in binding the silicate substance of the mold together. One method for making foundry cores employing a phenol-resorcinol resin and using a catalyst for the resin binder is described in U.S. Pat. No. 3,525,379. In such method, a particular refractory material is mixed with both the phenol-resorcinol resin binder and the catalyst and then formed into the desired foundry core shape. Curing follows by way of exposure to a gaseous aldehyde material. The described method eliminates the need for utilization of strongly acidic and, therefore, equipment damaging acids or the high heat treatments of earlier foundry core making procedures.

Molding compositions suitable for use in the construction industry, such as in the formation of support structures, laminates, panel members and the like, often employ resorcinol-aldehyde-type resins. An example of such resins are disclosed in U.S. Pat. Nos. 4,053,447 and 4,076,873 directed to improved fire resistant resorcinol resins also employing furfuryl alcohol. Most of these resins harden by the addition of para-formaldehyde to the resorcinol mixture frequently under the addition of heat and, more preferably, at room temperature. Extensive emphasis has been placed on the rapid curing of the molding compositions, preferably at room temperature and frequently with the aid of accelerators and other reaction enhancing adjuvants.

During rapid curing of resorcinol molding compositions, difficulties arise due to shrinkage of the resinous material in its cured state. Often the molten composition also becomes too brittle for use particularly in the building industry. In a similar fashion to the molding composition, resorcinol resins employed as coating compositions have a tendency to crack and craze upon final cure, making them unsuitable for use in many commercial applications.

SUMMARY OF THE INVENTION

The present invention has as its purpose to remedy the above-mentioned drawbacks of prior art resorcinol and phenol-resorcinol compositions and provide a versatile resinous composition suitable for use in a wide variety of applications.

The particular resins of the instant invention are phenol-resorcinol resins which have been subjected to processing conditions which uniquely adapt the resinous material to a polymer further polymerizable to various molding compositions, coatings, binders and the like.

The processing treatment includes an initial mixing of an aqueous phenol-resorcinol resin with a minor amount of acid or base. After the thorough mixing, the resulting mixture is permitted to stand for a period of at least about 48 hours. During this time, the phenol-resorcinol mixture changes color slowly from its original brown to a light yellow and then toward an orange color. Once it reaches this orange color in about 48 hours, it is ready for further processing. During this stationary period, an aqueous by-product forms on top of the phenol-resorcinol resin. After the 48-hour period, the aqueous by-product is separated from the phenol resorcinol resin. In this fashion, a stable resin is formed which may be further mixed with various copolymerization agents, fillers, solvents and other adjuvants for forming molding compositions, coatings, binders, laminates and the like.

The particular aqueous phenol-resorcinol resin used as a starting material is itself capable of curing at room temperature with the addition of suitable crosslinking materials such as urea-formaldehyde condensates. One such phenol-resorcinol resin suitable in the instant invention is a phenol resorcinol adhesive sold by Borden Chemical under the name CASCOPHEN LT-68D. This liquid phenol-resorcinol resin exhibits a viscosity of 215–265 cps, a specific gravity of 1.139, a solids content of 54.5 and a water dilutability of at least 100%. The phenol-resorcinol prepolymer itself is dissolved in an aqueous solution containing a volatile solvent.

In the process of the instant invention, a minor amount of acid or base is thoroughly mixed with the aqueous phenol resorcinol resin by any of several conventional mixing apparatus. Although a minor amount of acid or base is employed, the mixing is necessary to thoroughly distribute the acid or base throughout the liquid phenol-resorcinol resin. The amount of acid or base employed generally comprises from about 2.5% to about 5% based on the volume of liquid phenol-resorcinol resin. Larger percentages of acid or base may be employed, but without significant advantage sufficient to justify the additional cost of the materials. The concentration of the acid or base has an effect on the amount employed and the percentages given apply generally to concentrations of acids and bases which are easy to add and mix into the phenol-resorcinol starting material.

The acids or bases mixed with the aqueous phenol-resorcinol resin according to the instant invention include the preferred inorganic acids such as phosphoric acid and sulfuric acid and the preferred organic acid such as acetic acid. A preferred base is sodium hydroxide. Other suitable acids and bases include many inorganic and organic materials which when thoroughly mixed with the liquid phenol-resorcinol resin accelerate the splitting off of the aqueous solution from the resin mixture over the period of 48 hours.

Other preferred acids can be but are not limited to Nitric, Hydrochloric, Lactic and Perchloric Acids. Additionally, another preferred base can be Potassium Hydroxide.

Another preferred Phenol-resorcinol resin used as a starting material could be a commercially available product sold by Monsanto designated as PRF 2915.

Without being bound to any specific theory, it is believed that the liquid phenol-resorcinol mixture containing acid or base partially cures to a certain extent yielding water which separates from the phenol-resorcinol resin and possibly splitting off hydroxyl groups from available sites on the resorcinol molecule. In any event, significant quantities of an aqueous solution are formed on top of the resinous composition. Separation of the water by simple pouring of the liquid off of the top of the resin composition or by a centrifuging operation yields a stable resorcinol composition suitable for use directly as a coating, molding composition, laminating material, binder or the like. This resorcinol composition may hereinafter be referred to as a modified resorcinol or modified phenol-resorcinol resin.

The modified resorcinol resin exhibits the following physical characteristics:
color, Orange
form, Thick, sticky, pourable
viscosity, Approximately 200 cps
specific gravity,
solids.

When employed in coating compositions, the modified resorcinol resin exhibits no cracking or crazing as occurs with the unmodified phenol-resorcinol resin. Similarly, surprisingly little shrinkage is evident with molding compositions employing the modified resorcinol resin. These improvements over the commercially available and prior art resorcinol resins are directly related to the 48-hour standing period. Permitting the phenol-resorcinol resin mixture to stand for periods less than about 48 hours fails to achieve the highly advantageous properties of the modified resorcinol resin of the instant invention. The standing period may extend longer than 48 hours up to a period of several days without becoming detrimental to these advantages properties of the final product. Variations in the ambient temperature and the pressures surrounding the phenol-resorcinol resin mixture during the standing period may, of course, alter the time period according to the known principles of polymerization and physical separation techniques. Standing at room temperature, however, and at normal atmospheric pressures provides an economical and safe processing environment.

The following examples are presented for illustrative purposes only and are not meant as limitations on this invention.

EXAMPLE I

Five gallons of commercially available liquid phenol-resorcinol resin, CASCOPHEN LT-68D is added to a mixing vessel. 28 Ounces of phosphoric acid are added to the liquid resorcinol resin and stirred with a high speed agitator for a period of about one minute. The mixture is permitted to stand undisturbed for about 48 hours during which time a significant volume of water forms on the top of the resorcinol mixture. After 48 hours the water is poured off the vessel. The water is slightly acidic. The resulting modified resorcinol has the following characteristics:
color, Orange
form, Thick, sticky, pourable
viscosity, Approximately 200 cps
specific gravity,
solids.

EXAMPLE II

The same procedure as employed in Example I is followed except that different acids or bases are utilized for the phosphoric acid of Example I. The mixtures are permitted to stand for various periods of time and the resulting aqueous solution is removed from the resulting modified resorcinol polymer. The physical characteristics of the modified resorcinol resin as prepared in the following table are equal to the improved modified resorcinol resins of Example I:

TABLE

| Example No. | Acid/Base | % | Standing Period (Hrs.) |
| --- | --- | --- | --- |
| 2 | Sulfuric Acid | 2.5 | 49 |
| 3 | Phthalic Acid | 5 | 50 |
| 4 | Acetic Acid | 4 | 51 |
| 5 | Sodium Hydroxide | 2.7 | 48 |

While the invention has been described in connection with specific embodiments thereof, it will be understood that it is capable of further modifications, and this application is intended to cover any variations, uses or adaptations of the invention following, in general, the principles of the invention and including such departures form the present disclosure as come within known or customary practice in the art to which the invention pertains and as may be applied to the essential features hereinbefore set forth, and as fall within the scope of the invention and the limits of the appended claims.

What is claimed is:

1. A resorcinol polymer prepared by the process of thoroughly mixing an aqueous phenol-resorcinol resin with a minor amount of acid or base, permitting said phenol-resorcinol mixture to stand for a period of at least 48 hours, forming an aqueous by-product, and separating said aqueous by-product from the resulting phenol-resorcinol polymer.

2. The resorcinol polymer of claim 1, wherein said aqueous phenol-resorcinol resin is capable of curing at room temperature.

3. The resorcinol polymer of claim 2, wherein said aqueous phenol-resorcinol resin is a phenol-resarcinol adhesive.

4. The resorcinol polymer of claim 3, wherein said aqueous phenol-resorcinol resin is a phenol-resorcinol adhesive in an aqueous solution containing volatile solvents.

5. The resorcinol polymer of claim 1 or 4, wherein said acid is mixed with said resin in an amount of from about 2.5% to 5% based on the volume of said resin.

6. The resorcinol polymer of claim 5, wherein said aqueous by-product is separated by decanting from said mixture after said period of at least about 48 hours.

7. The resorcinol polymer of claim 5, wherein said aqueous by-product is separated by centrifugation after said period of at least about 48 hours.

8. The resorcinol polymer of claim 1, wherein said period is from about 48 hours to about 72 hours.

9. The resorcinol polymer of claim 1, wherein said period is 48 hours at a temperature of about 22° C. and at atmospheric pressure.

10. The resorcinol polymer of claim 1, wherein said acid is selected from the group consisting of phosphoric, sulfuric, nitric, hydrochloric, perchloric, lactic, acetic and phthalic acids.

11. The resorcinol polymer of claim 1, wherein said base is selected from the group consisting of potassium hydroxide and sodium hydroxide.

12. A process for preparing a resorcinol polymer comprising:
thoroughly mixing an aqueous phenol-resorcinol resin with a minor amount of acid or base,
permitting said phenol-resorcinol mixture to stand for a period of at least 48 hours,
forming an aqueous by-product, and
separating said aqueous by-product from the resulting phenol-resorcinol polymer.

13. The process of claim 12, wherein said aqueous phenol-resorcinol resin is capable of curing at room temperature.

14. The process of claim 13, wherein said aqueous phenol-resorcinol resin is a phenol-resorcinol adhesive.

15. The process of claim 14, wherein said aqueous phenol-resorcinol resin is a phenol-resorcinol adhesive in an aqueous solution containing volatile solvents.

16. The process of claim 12 or 15, wherein said acid is mixed with said resin in an amount of from about 2.5% to 5% based on the volume of said resin.

17. The process of claim 16, wherein said aqueous by-product is separated by decanting from said mixture after said period of at least about 48 hours.

18. The process of claim 16, wherein said aqueous by-product is separated by centrifugation after said period of at least about 48 hours.

19. The process of claim 12, wherein said period is from about 48 hours to about 72 hours.

20. The process of claim 12, wherein said period is 48 hours at a temperature of about 22° C. and at atmospheric pressure.

21. The process of claim 12, wherein said acid is selected from the group consisting of phosphoric, sulfuric, nitric, hydrochloric, perchloric, lactic, acetic and phthalic acids.

22. The process of claim 12, wherein said base is selected from the group consisting of potassium hydroxide and sodium hydroxide.

* * * * *